April 2, 1957   E. S. ROBERTS ET AL   2,787,521
METHOD OF CONTINUOUSLY CONDUCTING A
LIQUID-GAS EXOTHERMIC REACTION
Filed June 2, 1951
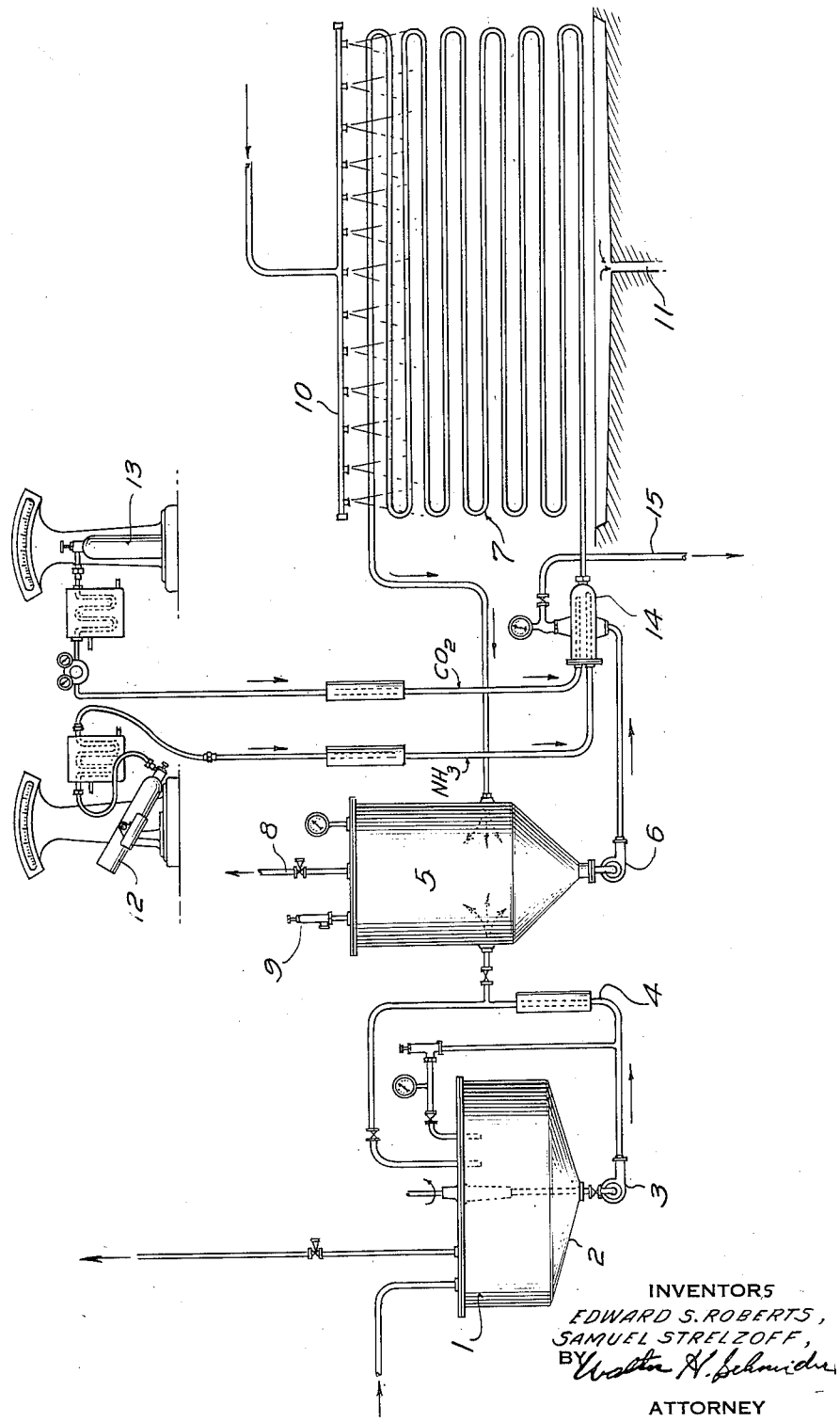
INVENTORS
EDWARD S. ROBERTS,
SAMUEL STRELZOFF,
ATTORNEY

United States Patent Office 2,787,521
Patented Apr. 2, 1957

2,787,521

METHOD OF CONTINUOUSLY CONDUCTING A LIQUID-GAS EXOTHERMIC REACTION

Edward S. Roberts and Samuel Strelzoff, New York, N. Y., assignors to Chemical Construction Corporation, New York, N. Y., a corporation of Delaware Application June 2, 1951, Serial No. 229,646

6 Claims. (Cl. 23—65)

This invention relates to chemical processes involving a change of phase. More particularly, it is concerned with improvements in method and apparatus for conducting such chemical processes. Still more specifically, it deals with processes wherein a solid is formed in a liquid by an exothermic liquid-gas reaction.

In general, the usual practice for conducting this type of chemical reaction is to employ reaction vessels into which the reactants are placed and in which the change from the liquid to the solid phase occurs. Several essential factors must be controlled to insure successful operation. First, the temperature must be properly controlled to insure optimum yield. Moreover, improper temperature conditions may produce such a fine precipitate as to render filtration practically impossible. Second, scale formation in the equipment should be avoided to permit proper removal of the heat of reaction and allow continuous operation. Another, but nonetheless important, factor is the avoidance of a degree of supersaturation that results in freezing of the equipment and prevention of continuous operation.

To avoid these undesirable conditions, it is the practice to employ one or more alternate reactor vessels. In the conventional type of reactor vessel, conditions for scale formation are very favorable, inasmuch as the movement of the materials is very slow. An arrangement of alternate reactor vessels permits an alternate vessel to be pressed into service while one encrusted with scale is taken out of operation for cleaning purposes. In this way, the equipment may be run in a more or less continuous manner while maintaining satisfactory control of the temperature. Such an arrangement, however, obviously increases initial investment as well as further complicating the operational procedure.

It is, therefore, a principal object of this invention to provide a process particularly adapted to handle chemical reactions in which there is a change of phase from the liquid to the solid, accompanied with a generation of heat. It is a further object of this invention to provide a process in which the precipitated solid is of such crystal size as to be readily filterable. It is a further object of this invention to provide a simple, economical and practical type of apparatus for carrying out the process.

The manner by which these objects have been accomplished is surprisingly simple, considering the problem they have for so long presented to the art. Surprisingly, it has been found that each of the objects may be met by providing a controlled circulating flow of a body of a slurry comprising both reactants and products of reaction. From this continuously circulating slurry, product is withdrawn and new reactants are added thereto. An apparatus suitable for accomplishing the above objects comprises, broadly, a closed circuit through which the slurry may be continuously circulated. Associated therewith are feed and withdrawal means, and means for removing the heat of reaction.

The major features of the present invention may be described with greater particularity by reference to the accompanying drawing which shows a simplified flow diagram of the continuous process and illustrates one form of apparatus suitable for conducting the process.

The diagram shows the general procedure employed. Those reactants required for the particular chemical reaction are fed in measured stoichiometric quantities from suitable storage facilities, directly into a body of slurry comprising reactants and products of reaction. This slurry is continuously passed through a closed circuit cooled to remove exothermic heat. Product solids are continuously removed from this circuit at a rate commensurate with the rates of reactant addition.

The apparatus illustrated for conducting the process comprises a tank 1 containing a supply of liquid reactant which may be kept in constant agitation by any conventional agitator means 2. This reactant is continuously withdrawn from the tank by feed pump 3 at the rate desired and fed through a feed pipe 4 to the reactor unit comprising a vertical cone-bottom surge tank 5, circulating pump 6, and reactor 7, all connected together by suitable conduits to permit continuous recirculation of the slurry. The surge tank 5 is provided with a vent 8 and a relief valve 9 while the reactor has associated therewith a water drip cooler 10 and a waste cooling water drain 11.

Other reactants are fed from supply sources indicated at 12 and 13 into the reactor through conduits connected to one branch of a cross type pipe fitting 14. Also connected to this fitting is the conduit leading from pump 6, while the remaining branch of the fitting serves as a product draw-off as indicated at 15. Located in each of the feed conduits is a feed valve for controlling the amounts of materials introduced, while reaction temperature, as controlled by the quantity and temperature of the water sprayed on the reactor may be measured with a portable potentiometer through a thermocouple. Rotameters, likewise, may be placed in each of the reactant feed lines.

For illustrative purposes, the use of this apparatus circuit will be described in conjunction with the production of sodium bicarbonate by reacting anhydrous liquid ammonia and carbon dioxide gas in a saturated brine solution. It should be understood, however, that the process and apparatus are in no manner limited thereto.

Sodium bicarbonate is produced in the apparatus of this invention by introducing measured stoichiometric quantities of saturated brine solution, carbon dioxide gas and anhydrous liquid ammonia into a continuously circulating slurry containing sodium bicarbonate crystals in suspension. The brine solution is fed from tank 1, wherein it is constantly agitated, into surge tank 5. Both the brine from tank 1 and the effluent from the reactor 7 enter the cone-shaped surge tank tangentially from where they are pumped into the reactor 7 by pump 6 through the cross fitting 14. To prevent cavitation of the pump 6, a diametric baffle may be installed at the top of the cone in surge tank 5.

Both the anhydrous liquid ammonia and the carbon dioxide are introduced at fitting 14 from where they enter the reactor along with the brine solution and the effluent. Associated with the sources of ammonia and carbon dioxide may be scales as illustrated on the drawing. A carbon dioxide heater and a carbon dioxide pressure regulator may be located in the carbon dioxide feed line, while the ammonia line may have therein a cooler.

The liquid phase circulating through the system consists essentially of ammonium chloride, unreacted sodium chloride and sodium bicarbonate, all in solution. A portion of the circulating slurry containing the bicarbonate crystals is continuously withdrawn as product at draw-off point 14 for further treatment in subsequent phases of the chemical process.

This circulating reactor system permits regulation of the rates of feed and withdrawal so that the amount of slurry retained in circulation is sufficient to maintain supersaturation of the liquid phase. The system further allows for controlled flow velocity of the circulating slurry by pump 6. This factor is of great importance since it permits the creation of a sufficiently high turbulence within the reactor to retain all solids in suspension and effectively prevent the formation of scale on the walls thereof. Thus the heat generated by the reaction may be continually and properly removed by the variable temperature water spray directed over the reactor so that the most desirable operating temperature may be maintained. By the proper removal of the heat of reaction, conditions of supersaturation may be maintained favorable to the formation of large crystals. The formation of large crystals is of great importance for subsequent phases of the chemical process such as the separation of the solid from the mother liquor and the final drying of the finished product.

A further important advantage of the arrangement is that due to the turbulence of the slurry in the reactor, the incoming reactants are properly distributed in a large circulating volume and a practically instantaneous reaction is obtained. This insures a high yield of conversion of the reactants.

Further advantages of the invention may be seen when it is employed for bicarbonate production, as described above for illustrative purposes. In the conventional carbonating tower used in bicarbonate manufacture, a counter-current flow of the ammoniated brine solution and carbon dioxide is employed. This results, inevitably, in a certain part of the free ammonia in the brine solution being swept out of the tower by the inert gases entering with the carbon dioxide. In the present invention, however, all of the ammonia and carbon dioxide are injected into the reactor co-currently. This injection is made at a point to favor all phases of the operation, namely, absorption of the ammonia and carbon dioxide, and the subsequent conversion of sodium chloride to sodium bicarbonate and ammonium chloride.

A further advantage in the production of bicarbonate is that the above mentioned reactants are injected into a suspension of bicarbonate which is already in equilibrium with all other components. Consequently, the whole advantage of the highest ammonia partial pressure can be taken. This is not true in the conventional carbonating tower. When equilibrium conditions are reached in the conventional design, it is at a point in the tower at which no fresh ammonia is introduced and the only ammonia present is that which remains after completion of the reaction.

The bicarbonate may also be produced by conducting the process in two stages. The apparatus necessary for such a two-stage reaction consists of two reactor systems connected in series. The second reactor system is identical to the one shown and described, and for this reason the two-stage arrangement has not been illustrated. In conducting the reaction in two stages, all of the brine and ammonia but only approximately half of the stoichiometric quantity of the carbon dioxide required is added rapidly to the circulating slurry in the reactor system of the first stage. This results in a clear solution with no crystals present and is withdrawn to be used as one of the reactants to be introduced into the reactor of the second stage. The remaining portion of the required stoichiometric quantity of carbon dioxide is fed to the reactor of the second stage along with the product of the first stage. The carbon dioxide is slowly fed to allow time for large crystal formation and good conversion efficiency. Product is continually withdrawn as in the single type illustration at a rate consistent with the feed rate of incoming reactants.

The apparatus employed is not limited in size to any particular capacity but may be of a size suitable to the amount of reactants to be used and the amount of products to be formed. The reactor, however, should be so dimensioned as to permit the removal of heat by the application of coolants to the exterior surface thereof so that the proper temperature of reaction may be maintained.

The reactor may take various forms. For instance, it may take the form of a straight pipe. Such an arrangement, however, would, obviously, be impractical for large scale operation. The reactor might take the form of a continuous coil, which, however, would increase the installation investment. The trombone type of reactor shown in the drawing is another form which may be employed. The trombone type reactor may be easily cleaned during operation by sweeping the outside surfaces thereof. This, therefore, further insures continuous, efficient heat exchange.

The design of the impeller of the circulating pump should be such as to reduce to a minimum the crystal breakage. The means for adjusting the capacity of the pump may take various forms. Thus, there may be a manual or automatic operated means associated with the impeller shaft. The adjustment means may also take the form of a by-pass arrangement.

As previously stated, the present invention is in no way limited to any particular chemical reaction. Besides being well adapted for carrying out the process of producing sodium bicarbonate, the invention is equally suitable, for instance, for the transformation of gypsum to ammonium sulfate by reacting a suspension of gypsum in liquid with ammonia and carbon dioxide. It may also be employed, for example, in the treatment of chromium ores with carbon dioxide to produce sodium dichromate and sodium carbonate. The invention, as indicated in the illustrative example, may be applied to processes employing circulations in series where the reactions are such as to require their being done in several stages or steps.

The method of the invention is not limited to any operating conditions of temperature and pressure, since these, in each case, will vary according to the particular chemical process being conducted. Since all of the reactions to which this invention is drawn are exothermic in nature, the pressure in the reactor unit will vary with any change made in the temperature. An increase of pressure for the reaction not otherwise obtainable may be made by increasing the rate of feed of the gaseous reactant so that the quantity of gas introduced is in excess to the stoichiometric quantity required for the reaction. Pressure existing above that desired for the reaction may be vented to the atmosphere through the vent provided on the surge tank.

The velocity of the circulating slurry through the reactor is of primary importance to the successful operation of the invention. A high enough velocity must be maintained to create a turbulence in the reactor sufficiently high to insure the prevention of scale formation and to obtain a high rate of conversion. This velocity will depend upon the size of the reactor as well as the physical characteristics of the circulating slurry. Accordingly, it is impossible to set any one minimum velocity value for all cases essential for obtaining the above mentioned condition. The slurry velocity, however, should be in such relation with the other factors so as to create a turbulence equivalent to a calculated Reynolds number of at least 500. At the same time, however, the velocity should be held at a minimum consistent with the reaction rate in order to avoid excessive crystal breakage by the rotation of the pump impeller.

The process of the invention is a truly continuous one and may be operated over long periods without the stoppages required in the conventional methods of conducting exothermic liquid-gas reactions. The use of alternate reaction vessels to render the process continuous and the necessity for periodically cleaning alternate vessels is entirely eliminated. At the same time it is possible with this continuous process to obtain a conversion efficiency comparing favorably with those obtained in conventional methods.

We claim:

1. In a method of continuously conducting exothermic reactions between a solution of a reactant and a gas and involving a change of phase of the reaction product so formed from the dissolved state to the crystalline state, the improvement which comprises, continuously circulating in a closed cyclic path, a body of a supersaturated solution of the reaction product containing as a slurry crystals of said product, continuously feeding a reactant-containing solution to the body, continuously feeding gaseous reactant to the body subsequent to the feeding of said solution in the cycle of flow, cooling said body substantially immediately subsequent to the addition thereto of the gaseous reactant to maintain the body at a substantially uniform, desired temperature, regulating the velocity of flow to insure sufficient turbulence to obtain both a high rate of reaction and maintain all crystals in suspension, withdrawing slurry containing product from the body and controlling the uniformity of crystal and crystal growth by adjusting the rate of feed of reactants and the withdrawal of slurry.

2. The method of claim 1, wherein the slurry is withdrawn from the body intermediate the feed of the solution, containing reactant and the feed of gaseous reactant in the cycle of flow.

3. The method of claim 1, in which the velocity of the circulating body is at least sufficient to create a turbulence equivalent to a calculated Reynolds number of at least 500.

4. The method of claim 1, wherein the reaction is carried out in a plurality of circulating stages with introduction of measured stoichiometric quantities of reactants being proportioned among the stages and the slurry drawn off as product from each stage, except the last, being employed as reactant for the next succeeding stage.

5. The method of continuously conducting exothermic reactions between a solution of a reactant and a gas and involving a change of phase of the reaction product so formed from the dissolved state to the crystalline state which comprises, continuously circulating in a closed cyclic path a quantity of a supersaturated solution of the reaction product containing as a slurry, crystals of said product, continuously feeding a reactant-containing solution into an enlarged enclosed body of said supersaturated solution for admixture of the same therewith, continuously withdrawing the admixture from the enlarged body and passing it through an elongated tubular conduit, continuously feeding gaseous reactant into the admixture at at least one point in said conduit, said feeding of gaseous reactant being subsequent to the feeding of said reactant-containing solution in the cycle of flow, cooling the contents of said conduit during passage therethrough, discharging the contents of the conduit into said enlarged body of saturated solution, regulating the velocity of flow of solution through the tubular conduit and in the enlarged body to insure sufficient turbulence to obtain both a high rate of reaction and maintain all crystals in suspension, continuously withdrawing slurry from said circulating solution and controlling the uniformity of crystal and crystal growth by adjusting the rate of feed of reactants and withdrawal of slurry.

6. A method of producing sodium bicarbonate which comprises continuously recirculating an aqueous slurry comprising an aqueous solution of sodium chloride, ammonium chloride and sodium bicarbonate, supersaturated with respect to sodium bicarbonate and having sodium bicarbonate crystals suspended therein, through a closed path including in succession a gas injection stage, a reaction stage of restricted cross-sectional area and substantial length and a brine-injection stage and crystallizing additional sodium bicarbonate from said solution during the recirculation, injecting stoichiometric quantities of ammonia and carbon dioxide into the solution in said gas-injecting stage, forming additional dissolved sodium bicarbonate in the reaction stage to replace that removed by crystallization and maintain the solution in its supersaturated condition, passing the mixture through said reaction stage at a velocity sufficiently high to maintain all crystals in suspension while simultaneously removing the heat of reaction therefrom, introducing stoichiometric quantities of aqueous sodium chloride solution in said brine-injection stage, and drawing off a portion of the slurry from the circuit between said brine-injecting and gas-injecting stages.

References Cited in the file of this patent

UNITED STATES PATENTS

| Re. 15,314 | Nagelvoort | Mar. 21, 1922 |
| 743,352 | Trump | Nov. 3, 1903 |
| 995,898 | Peacock | June 20, 1911 |
| 1,006,823 | Block | Oct. 24, 1911 |
| 1,221,506 | Bucher | Apr. 3, 1917 |
| 1,611,401 | Arnold | Dec. 21, 1926 |
| 1,865,303 | Charrier | June 28, 1932 |
| 1,937,885 | Gitzen et al. | Dec. 5, 1933 |
| 2,091,898 | Weber | Aug. 31, 1937 |
| 2,189,826 | Windecker | Feb. 13, 1940 |
| 2,318,463 | Bussmann | May 4, 1943 |
| 2,375,730 | Caldwell et al. | May 8, 1945 |
| 2,446,442 | Taylor | Aug. 3, 1948 |